(12) United States Patent
Yasuda

(10) Patent No.: US 7,225,066 B2
(45) Date of Patent: May 29, 2007

(54) SUPPORT SYSTEM FOR A VEHICULAR ECU CONTROL MEASUREMENT SYSTEM

(75) Inventor: Takeshi Yasuda, Kobe (JP)

(73) Assignee: Fujitsu Ten Limited, Kobe (JP)

( * ) Notice: Subject to any disclaimer, the term of this patent is extended or adjusted under 35 U.S.C. 154(b) by 0 days.

(21) Appl. No.: 10/282,005

(22) Filed: Oct. 29, 2002

(65) Prior Publication Data

US 2003/0084131 A1 May 1, 2003

(30) Foreign Application Priority Data

Oct. 30, 2001 (JP) ............................. 2001-331783

(51) Int. Cl.
G06F 19/00 (2006.01)
G06F 11/30 (2006.01)
G06F 9/445 (2006.01)

(52) U.S. Cl. .............................. 701/33; 700/90; 703/8; 702/183; 702/185; 702/188; 717/168

(58) Field of Classification Search ................ 700/90, 700/95, 108; 709/220–222; 713/100; 701/33; 703/8

See application file for complete search history.

(56) References Cited

U.S. PATENT DOCUMENTS

| | | | |
|---|---|---|---|
| 5,771,354 A | | 6/1998 | Crawford |
| 6,012,100 A | * | 1/2000 | Frailong et al. ............ 709/250 |
| 6,055,468 A | * | 4/2000 | Kaman et al. ................. 701/29 |
| 6,067,009 A | * | 5/2000 | Hozuka et al. ............... 340/459 |
| 6,104,988 A | * | 8/2000 | Klarer ......................... 702/183 |
| 6,205,579 B1 | * | 3/2001 | Southgate .................... 717/173 |
| 6,263,322 B1 | * | 7/2001 | Kirkevold et al. .......... 705/400 |
| 6,282,469 B1 | * | 8/2001 | Rogers et al. ................. 701/29 |
| 6,434,455 B1 | * | 8/2002 | Snow et al. ................... 701/33 |
| 6,442,460 B1 | * | 8/2002 | Larson et al. ................. 701/33 |
| 6,571,191 B1 | * | 5/2003 | York et al. ................... 702/107 |
| 6,611,739 B1 | * | 8/2003 | Harvey et al. ................ 701/29 |
| 6,615,120 B1 | * | 9/2003 | Rother ......................... 701/33 |
| 6,636,789 B2 | * | 10/2003 | Bird et al. .................... 701/29 |
| 6,654,673 B2 | * | 11/2003 | O'Neal et al. ................ 701/33 |
| 2001/0007086 A1 | * | 7/2001 | Rogers et al. ................. 701/33 |
| 2002/0193925 A1 | * | 12/2002 | Funkhouser et al. ......... 701/33 |
| 2003/0195681 A1 | * | 10/2003 | Rother ......................... 701/33 |

FOREIGN PATENT DOCUMENTS

| | | |
|---|---|---|
| JP | A 10-164181 | 6/1998 |
| JP | A 11-110248 | 4/1999 |
| JP | A 2000-196769 | 7/2000 |
| WO | WO 01/77983 A1 | 10/2001 |

* cited by examiner

Primary Examiner—Ryan A Jarrett
(74) Attorney, Agent, or Firm—Oliff & Berridge, PLC

(57) ABSTRACT

A support system comprises a support center 21 and a control measurement system 31 to be supported, which are connected via a computer network 28. The control measurement system 31 comprises means for collecting information which is available for support and when a predetermined condition holds, transmitting the collected information to the support center 21. The support center 21 comprises means for receiving the information transmitted from the control measurement system 31 and storing the received information. The information transmitted from the control measurement system 31 contains information concerning user's setting for the control measurement system 31.

14 Claims, 12 Drawing Sheets

SUPPORT SYSTEM FOR A VEHICULAR ECU CONTROL MEASUREMENT SYSTEM

The present disclosure relates to the subject matter contained in Japanese Patent Application No.2001-331783 filed on Oct. 30, 2001, which is incorporated herein by reference in its entirety.

BACKGROUND OF THE INVENTION

1. Field of the Invention

This invention relates to a support system and more particularly to a support system by which a support providing party such as a support center supports the apparatus to be supported, delivered to each user.

2. Description of the Related Art

In recent years, a controller 2 also called an ECU (Electronic Control Unit) has been installed in a vehicle 1 and various signals are transferred between a control mechanism of the vehicle 1 and the controller 2 for the controller 2 to perform electronic control of the vehicle 1, as shown in FIG. 11(a).

For example, as shown in FIG. 11(b), signals indicating the engine speed, the vehicle speed, etc., detected by various sensors placed in the vehicle 1 are sent to an ECU 2a for engine control, which then performs predetermined calculation processing based on the sent signals and sends the calculation result (for example, signal to control the fuel oil consumption, the ignition timing, the bypass air amount, etc.,) to the control mechanism of an actuator, etc., placed in the vehicle 1 for totally performing ignition timing control, knock control, idle speed control, etc., centering on fuel oil consumption control.

The signal input to the ECU 2a for engine control and the signal output therefrom change from moment to moment and further some of the signals, such as the signals indicating the engine speed, the vehicle speed, etc., and the control signals, change while they depend on each other.

Thus, to perform operation check and performance evaluation of the ECU 2a for engine control, the ECU 2a for engine control needs to be installed in the actual vehicle 1 or a control measurement system 3 as shown in FIGS. 12 and 13 for simulating the behavior of the vehicle 1 (namely, putting into mathematical expression and performing calculation processing) needs to be used.

The control measurement system 3 includes a computer 4, a measurement board and rack 5, and an ECU interface box 6. The computer 4 includes a microcomputer 7 having a control measurement unit 8 registering application software for performing operation check and performance evaluation of the ECU 2a for engine control, etc., using the measurement board and rack 5, an input unit 9, and a display unit 10.

The measurement board and rack 5 includes a CPU board 11 for performing various types of data processing and simulation calculations (model calculations), an I/O control board 12, an analog input board 13, an analog output board 14, a digital input/output board 15, a pulse input/output board 16, and a variable resistor board 17.

The measurement board and rack 5 simulatedly calculates the state amounts of the parts of the vehicle 1 (for example, the engine speed, the vehicle speed, etc.,) based on the control signals sent from the ECU 2a for engine control and input elements input from the computer 4, and returns the calculation result to the ECU 2a for engine control through the ECU interface box 6.

That is, the control measurement system 3 is a system that can execute HIL (Hardware In the Loop) simulation and such a system is used as a vehicle model instead of the actual vehicle 1, whereby it is made possible to drastically decrease the weight of operation check and performance evaluation of the ECU 2a for engine control using the actual vehicle 1 and facilitate development of control logic, etc.

By the way, for a system for executing HIL simulation, such as the control measurement system 3, often the user changes setting of software and hardware as the user desires. Thus, it is difficult for the support providing party (for example, support center) to precisely keep track of the setup state (for example, I/O port assignment state), the operation state (for example, CPU load factor), etc., of each system.

For example, the user can design a vehicle model as desired using MATLAB/SIMULINK (registered trademark) of a control system design tool of The Math Works USA, etc., and I/O port assignment, numeric value conversion expression in I/O port (for example, conversion between voltage and physical value), calculation period, the number of sampling data pieces in one period, and the like are set based on the design.

Thus, it is difficult for the support providing party to keep track of the setup state, of course, and the support providing party cannot keep track of the operation state in the control measurement system 3 for realizing a vehicle model designed as desired by the user (for example, use frequency, CPU load factor, user operation procedure, model scale, failure state).

Therefore, if the support providing party receives a communication of a failure or a defective condition of the control measurement system 3 from the user, there is a problem of the incapability of quickly offering appropriate advice. The support person needs to make a visit to the place where the system is delivered to precisely keep track of the state depending on the situation; there is a problem of requiring much time and large cost.

When a new commodity that can be used with the control measurement system 3 is developed, if the support person cannot precisely keep track of the setup state or the operation state of the control measurement system 3 delivered to each user, there is a problem for the support person to be unable to properly determine which commodity is to be introduced to which user.

SUMMARY OF THE INVENTION

It is therefore an object of the invention to provide a support system wherein a support providing party can precisely keep track of the setup state, the operation state, etc., of the apparatus to be supported and can support the apparatus appropriately.

To the end, according to the invention, there is provided a support system (1) having a support apparatus installed in a support center and an apparatus to be supported. The support apparatus and the apparatus to be supported are connected via a communication line. The apparatus to be supported includes a unit for collecting information, which is available for support, and transmitting the collected information to the support center when a predetermined condition holds. The support apparatus includes a unit for receiving the information transmitted from the apparatus to be supported and storing the received information. The information transmitted from the apparatus to be supported contains information concerning user's setting for the apparatus to be supported.

According to a support system (2) of the invention, in the support system (1), the support apparatus includes a first storage unit for storing information concerning the configuration of the apparatus to be supported and a first analysis unit for analyzing the use state of the apparatus to be supported based on the information concerning the configuration of the apparatus to be supported, stored in the first storage unit and the information concerning user's setting for the apparatus to be supported, transmitted from the apparatus to be supported.

According to a support system (3) of the invention, in the support system (2), the support apparatus includes a first preparation unit for preparing support information for the user based on the analysis result of the first analysis unit.

According to any of the support systems (1) to (3) described above, the support apparatus can acquire the information concerning user's setting for the apparatus to be supported (for example, information concerning I/O port assignment, numeric value conversion expression in I/O port, calculation period, etc.,), so that if the support person does not make a visit to each user, the support center in which the support apparatus is installed can keep track of the setup state of the apparatus to be supported, delivered to the user.

Therefore, the support center can analyze the use state of the apparatus to be supported based on the information concerning user's setting for the apparatus to be supported, and can give appropriate advice to the user based on the analysis result.

For example, the number of channels used with each board is found from the information concerning I/O port assignment and whether or not the number of channels is enough is determined. If it is not determined that the number of channels is enough, appropriate advice such that "it is advisable to install an additional board" or "it is advisable to replace with a board having a large number of channels" can be given to the user.

If a use mistake of the user is found from the information concerning the setting of a conversion expression, upper and lower limit values, an initial value, etc., for each board, the user can be informed of the appropriate use method or that a seminar will be held.

According to the support system (2) or (3) described above, the support apparatus includes the first analysis unit for analyzing the use state of the apparatus to be supported based on the information concerning the user's setting for the apparatus to be supported, so that the use state of the apparatus to be supported can be analyzed automatically. Therefore, the need for the support person to perform work concerning the analysis is eliminated and a more efficient support system can be provided.

Further, according to the support system (3) described above, the support apparatus includes the first preparation unit for preparing support information for the user based on the analysis result of the first analysis unit, so that the support information can be prepared automatically. Therefore, the need for the support person to think what advice is to be given to the user is eliminated, and a very efficient and useful support system can be provided.

According to the invention, there is provided a support system (4) includes a support apparatus installed in a support center and an apparatus to be supported. The support apparatus and the apparatus to be supported are connected via a communication line. The apparatus to be supported includes a unit for collecting information, which is available for support, and transmitting the collected information to the support center when a predetermined condition holds. The support apparatus includes a unit for receiving the information transmitted from the apparatus to be supported and storing the received information. The information transmitted from the apparatus to be supported contains information concerning the operation state of the apparatus to be supported.

According to a support system (5) of the invention, in the support system (4), the information concerning the operation state of the apparatus to be supported contains at least one of failure information, information concerning CPU load, information concerning user operation procedure, and information concerning operation time.

According to a support system (6) of the invention, in the support system (5), the support apparatus includes a failure diagnosis unit for conducting a failure diagnosis of the apparatus to be supported based on the failure information transmitted from the apparatus to be supported.

According to a support system (7) of the invention, in the support system (6), the support apparatus includes a second preparation unit for preparing support information for the user based on the diagnosis result of the failure diagnosis unit.

According to a support system (8) of the invention, in the support system (5), the support apparatus includes a second analysis unit for analyzing the operation state of the apparatus to be supported based on the information concerning the CPU load transmitted from the apparatus to be supported.

According to a support system (9) of the invention, in the support system (8), the support apparatus includes a third preparation unit for preparing support information for the user based on the analysis result of the second analysis unit.

According to a support system (10) of the invention, in the support system (5), the support apparatus includes a third analysis unit for analyzing the use state of the user based on the information concerning the user operation procedure or the operation time, transmitted from the apparatus to be supported.

According to a support system (11) of the invention, in the support system (10), the support apparatus includes a fourth preparation unit for preparing support information for the user based on the analysis result of the third analysis unit.

According to any of the support systems (4) to (11) described above, the support apparatus can acquire the information concerning the operation state of the apparatus to be supported (for example, failure information, information concerning CPU load, information concerning user operation procedure, and information concerning operation time), so that if the support person does not make a visit to each user, the support center in which the support apparatus is installed can keep track of the operation state of the apparatus to be supported, delivered to the user.

Therefore, the support center can analyze the operation state of the apparatus to be supported (for example, failure cause, CPU load rate, presence or absence of operation procedure error, operation state of the apparatus) based on the information concerning the operation state of the apparatus to be supported, and can give appropriate advice to the user based on the analysis result.

For example, from the failure information, a failure diagnosis is conducted and the failure cause is found out and appropriate advice to resolve the failure cause can be given to the user. From the information concerning the CPU load, for example, the extent to which the capability of a CPU board is used is determined and if it is not determined that there is an allowance for the CPU board, appropriate advice such that "it is advisable to upgrade the CPU board" can be given to the user.

If an operation procedure mistake is found from the information concerning the user operation procedure, the user can be informed of the appropriate operation method or that a seminar will be held. The use frequency of the apparatus is found from the information concerning the operation time and if it is determined that the use frequency is low (namely, the user cannot much effectively use the apparatus), the user can be informed that a seminar will be held.

According to the support system (6) to (7) described above, the support apparatus comprises the failure diagnosis unit for conducting a failure diagnosis of the apparatus to be supported based on the failure information of the apparatus to be supported, so that the failure cause of the apparatus to be supported can be found out automatically. Therefore, the need for the support person to perform work to find out the failure cause is eliminated and a more efficient support system can be provided.

Further, according to the support system (7) described above, the support apparatus includes the second preparation unit for preparing support information for the user based on the diagnosis result of the failure diagnosis unit, so that the support information can be prepared automatically. Therefore, the need for the support person to think appropriate advice to resolve the failure cause is eliminated, and a very efficient and useful support system can be provided.

According to the support system (8) or (9) described above, the support apparatus includes the second analysis unit for analyzing the operation state of the apparatus to be supported based on the information concerning the CPU load of the apparatus to be supported, so that, for example, the extent to which the capability of a CPU board is used can be found automatically. Therefore, the need for the support person to perform work concerning the analysis is eliminated and a more efficient support system can be provided.

Further, according to the support system (9) described above, the support apparatus includes the third preparation unit for preparing support information for the user based on the analysis result of the second analysis unit, so that the support information can be prepared automatically. Therefore, the need for the support person to think what advice is to be given to the user is eliminated, and a very efficient and useful support system can be provided.

According to the support system (10) or (11) described above, the support apparatus includes the third analysis unit for analyzing the operation state of the apparatus to be supported based on the information concerning the user operation procedure or the operation time of the apparatus to be supported, so that, for example, whether or not an operation procedure mistake is included or whether or not the user uses the apparatus effectively can be determined automatically. Therefore, the need for the support person to perform work concerning the analysis is eliminated and a more efficient support system can be provided.

Further, according to the support system (11) described above, the support apparatus includes the fourth preparation unit for preparing support information for the user based on the analysis result of the third analysis unit, so that the support information can be prepared automatically. Therefore, the need for the support person to think what advice is to be given to the user is eliminated, and a very efficient and useful support system can be provided.

According to a support system (12) of the invention, in the support system (3), (7), or (9), the support apparatus includes a second storage unit for storing both or either of information concerning replacement parts of the apparatus to be supported and information concerning upgrade of the apparatus to be supported. The preparation unit prepares both or either of information concerning the appropriate replacement parts for the apparatus to be supported and information concerning upgrade of the apparatus to be supported based on the analysis result of the analysis unit or the diagnosis result of the failure diagnosis unit and both or either of the information concerning replacement parts and the information concerning upgrade, stored in the second storage unit.

According to the support system (12) described above, if it is determined that parts (containing software) replacement or upgrade should be carried out based on the analysis result of the analysis unit (first or second analysis unit) or the diagnosis result of the failure diagnosis unit, both or either of the information concerning the appropriate replacement parts and the information concerning upgrade can be prepared as the support information for the user. Therefore, very useful information can be provided for the user.

According to a support system (13) of the invention, in the support system (3) or (11), the support apparatus includes a third storage unit for storing information concerning a seminar. The preparation unit prepares seminar guide information based on the analysis result of the analysis unit and the information concerning the seminar stored in the third storage unit.

According to the support system (13) described above, if it is determined that the user is not familiar with the use method of the apparatus based on the analysis result of the analysis unit (first or third analysis unit), seminar guide information can be prepared as the support information for the user. Therefore, very useful information can be provided for the user.

According to a support system (14) of the invention, in any of the support systems (3), (7), (9), and (11) to (13), the support apparatus includes a first transmission unit for transmitting the support information prepared by the preparation unit to the apparatus to be supported.

According to the support system (14) described above, the support apparatus includes the first transmission unit for transmitting the support information prepared by the preparation unit (any of the first to fourth preparation unit) to the apparatus to be supported, so that the support information for the user can be transmitted to the user. Therefore, the need for the support person to give oral advice by telephone or the like is eliminated.

According to the invention, there is provided a support system (15) including a support apparatus installed in a support center and an apparatus to be supported. The support apparatus and the apparatus to be supported are connected via a communication line. The apparatus to be supported includes a unito for collecting information which is available for support and transmitting the collected information to the support center when a predetermined condition holds. The support apparatus includes a unit for receiving the information transmitted from the apparatus to be supported and storing the received information. The support apparatus includes a first storage unit for storing information concerning the configuration of the apparatus to be supported, a second storage unit for storing both or either of information concerning replacement parts of the apparatus to be supported and information concerning upgrade of the apparatus to be supported, a fifth preparation unit for preparing both or either of information concerning the appropriate replacement parts for the apparatus to be supported and information concerning upgrade of the apparatus to be supported based on the information concerning the configuration of the apparatus to be supported, stored in the first storage unit and both or either of the information concerning replacement parts and the information concerning upgrade, stored in the second storage unit, a second transmission unit for transmitting the information prepared by the fifth preparation unit to the apparatus to be supported.

According to a support system (16) of the invention, in the support system (15), the support apparatus includes a third storage unit registering information concerning the apparatus to be supported in relation to each user. The apparatus to be supported includes an input unit for entering identification information to identify each user and a third transmission unit for transmitting the identification information entered through the input unit to the support apparatus, and the fifth preparation unit for preparing both or either of the information concerning the appropriate replacement parts for the apparatus to be supported and the information concerning upgrade of the apparatus to be supported based on the identification information transmitted from the apparatus to be supported.

According to a support system (17) of the invention, in the support system (15), the support apparatus includes a third storage unit registering information concerning the apparatus to be supported in relation to each user. The apparatus to be supported includes a fourth transmission unit for automatically transmitting identification information to identify each user to the support apparatus when the apparatus to be supported is connected to the support apparatus. The fifth preparation unit prepares both or either of the information concerning the appropriate replacement parts for the apparatus to be supported and the information concerning upgrade of the apparatus to be supported based on the identification information transmitted from the apparatus to be supported.

According to any of the support systems (15) to (17) described above, if it is determined that parts (containing software) replacement or upgrade should be carried out based on the information concerning the configuration of the apparatus to be supported, both or either of the information concerning the appropriate replacement parts and the information concerning upgrade can be prepared as the support information for the user, and the prepared information can be transmitted to the user.

That is, if new parts that can be used with the apparatus to be supported are developed or the already installed parts are upgraded, the user can be informed of the fact. Therefore, the parts information fitted for each user can be provided for the user.

According to the support system (16) described above, the user enters the identification information, whereby the parts information fitted for each user, etc., can be provided for the user. In other words, if the user does not enter the identification information, the parts information is not transmitted to the user, so that introduction of the parts information can be received only when the user desires.

According to the support system (17) described above, when the apparatus to be supported and the support apparatus are connected, automatically the identification information is transmitted from the apparatus to be supported to the support apparatus. Thus, the need for the user to enter the identification information as in the support system (16) described above is eliminated, so that a system intended for the ease of operation can be provided.

According to the invention, there is provided a support system (18) including a support apparatus installed in a support center and an apparatus to be supported. The support apparatus and the apparatus to be supported are connected via a communication line. The apparatus to be supported includes a unit for collecting information which is available for support and transmitting the collected information to the support center when a predetermined condition holds. The support apparatus includes a unit for receiving the information transmitted from the apparatus to be supported and storing the received information. The information transmitted from the apparatus to be supported contains information concerning software built in the apparatus to be supported.

According to a support system (19) of the invention, in the support system (18), the support apparatus includes a fourth storage unit for storing information concerning upgrade of the software built in the apparatus to be supported, a sixth preparation unit for preparing appropriate software information for the apparatus to be supported based on the information concerning software, transmitted from the apparatus to be supported and the information concerning upgrade of the software, stored in the fourth storage unit, and a fifth transmission unit for transmitting the information prepared by the sixth preparation unit to the apparatus to be supported. The apparatus to be supported includes a presentation unit for presenting the appropriate software information for the apparatus to be supported, transmitted from the support apparatus for the user.

According to a support system (20) of the invention, in the support system (19), the support apparatus includes a fifth storage unit for storing data forming the software to be built in the apparatus to be supported, and a sixth transmission unit, upon reception of a request to transmit the data forming the software fitted for the apparatus to be supported from the apparatus to be supported, for transmitting the data to the apparatus to be supported. The apparatus to be supported includes a command unit for the user to enter a command for transmitting the data, and seventh transmission unit for transmitting a signal indicating a request to transmit the data to the support apparatus when the command is entered through the command unit.

According to any of the support systems (18) to (20) described above, the support apparatus can acquire the information concerning the software built in the apparatus to be supported (for example, information concerning the versions of basic software, driver software, I/O board firmware, etc.,). Thus, if the support person does not make a visit to each user, the support center in which the support apparatus is installed can keep track of the version of software built in the apparatus to be supported, delivered to the user.

Therefore, the support center can determine whether or not the software is of the latest version based on the information concerning the version of software built in the apparatus to be supported, and can give appropriate advice to the user based on the determination result.

For example, whether or not the version of the I/O board firmware built in the apparatus to be supported is the latest version is determined from the information concerning the version of the I/O board firmware. If it is determined that the version is not the latest version, appropriate advice such that "You might as well replace the I/O board firmware with that of the latest version" can be given to the user.

According to the support system (19) described above, the support apparatus comprises the sixth preparation unit for preparing appropriate software information for the apparatus to be supported based on the information concerning software built in the apparatus to be supported, so that useful information for the user can be prepared automatically and the automatically prepared useful information is transmitted to the user and is presented to the user. Thus, a very excellent system high in practicality can be provided.

Further, according to the support system (20) described above, if the user makes a request to download software fitted for the apparatus to be supported (for example, software of the latest version), the software can be downloaded, so that a system having a very high efficiency can be provided. According to a support system (21), there is provided a support system including a support device and a device to be supported. The device to be supported includes a collection and transmission unit for collecting information, which is available for support, and transmitting the collected information to the support device at a predetermined timing. The support device includes a storage unit for storing the information transmitted from the device to be supported. The storage unit further stores predetermined information. The support device further includes an analysis unit for analyzing the information transmitted from the device to be supported and the predetermined information.

According to a support system (22), in the support system (21), the support device further includes a preparation unit for preparing support information based on the analysis result by the analysis unit and a transmission unit for transmitting the support information to the device to be supported.

According to a support system (23), in the support system (21), the information transmitted from the device to be supported contains information concerning user's setting with respect to the device to be supported. The predetermined information contains information concerning configuration of the device to be supported. The analysis result by the analysis unit indicates use state of the device to be supported.

According to a support system (24), in the support system (23), the predetermined information further contains information concerning a seminar. The support information is guidance information of the seminar.

According to a support system (25), in the support system (21), the information transmitted from the device to be supported contains information concerning operation state of the device to be supported, the information having at least one of information concerning an operation procedure by user and information concerning operating time. The analysis result by the analysis unit indicates use state by the user. The support device further includes a preparation unit for preparing support information based on the analysis result by the analysis unit and a transmission unit for transmitting the support information to the device to be supported.

According to a support system (26), in the support system (25), the predetermined information contains information concerning a seminar. The support information is guidance information of the seminar.

According to a support system (27), in the support system (22), the predetermined information contains information concerning configuration of the device to be supported and at least one of information concerning replacement parts with respect to the device to be supported and information concerning upgrade. The analysis result by the analysis unit indicates at least one of information concerning replacement parts suitable for the device to be supported and information concerning upgrade of the device to be supported.

According to a support system (28), in the support system (27), the predetermined information further contains information concerning the device to be supported, the information corresponding to each user. The device to be supported further includes an input unit for inputting identification information for identifying users and a transmission unit for transmitting the inputted identification information to the support device. The preparation unit prepares the support information based on the analysis result by the analysis unit and the identification information.

According to a support system (29), in the support system (27), the predetermined information further contains information concerning the device to be supported, the information corresponding to each user. The device to be supported further includes a transmission unit for automatically transmitting identification information to the support device when the device to be supported is connected to the support device. The preparation unit prepares the support information based on the analysis result by the analysis unit and the identification information.

DETAILED DESCRIPTION OF THE PREFERRED EMBODIMENTS

Figure 1:
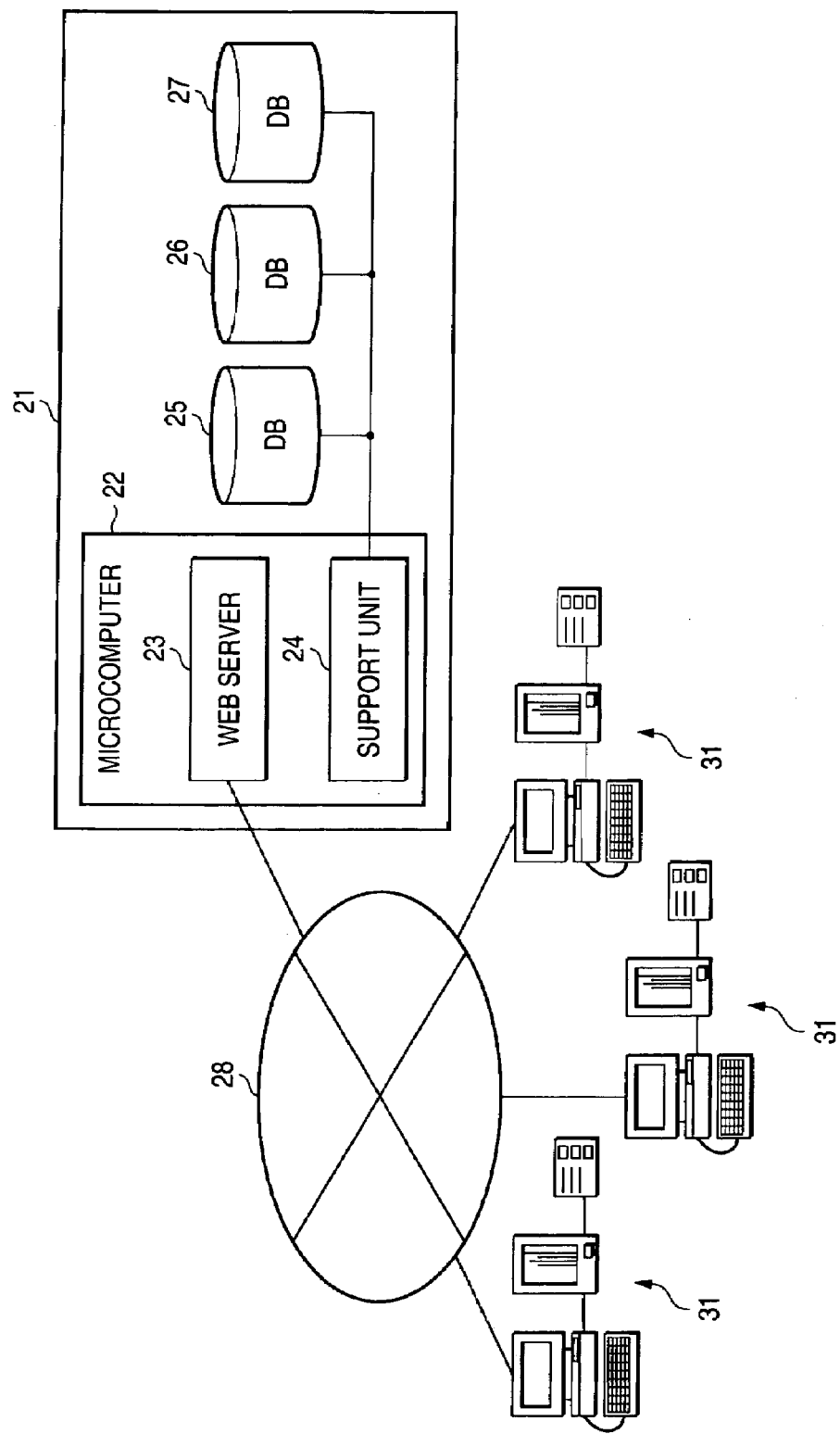
FIG. 1 is a block diagram to schematically show the main part of a support system according to a first embodiment of the invention.

Referring now to the accompanying drawings, there are shown preferred embodiments of support system according to the invention. FIG. 1 is a block diagram to schematically show the main part of a support system according to a first embodiment of the invention.

In the figure, numeral 21 denotes a support center. The support center 21 includes a microcomputer 22 having a Web server 23 and a support unit 24 for analyzing the user state and the operation state of a control measurement system 31 delivered to each user, conducting a failure diagnosis, and preparing various pieces of support information based on the analysis result and the failure diagnosis result, a customer information database 25, a parts information database 26, and a failure diagnosis database 27. The support center 21 is connected to a computer network (simply, network) 28.

The customer information database 25 is a database for storing the ID codes, the customer names, and the addresses of customers, information concerning the configurations of the control measurement systems 31 delivered to the customers (namely, to be supported), and the like. The information concerning the configuration of the control measurement system 31 includes the types of parts (containing software) making up the system, the version of parts, the manufacturing date of parts, etc.

The parts information database 26 is a database for storing information concerning the types, the versions, the manufacturing times, the structures, and the operation characteristics of the parts (containing software), replacement parts information (for example, information concerning new developed parts and upgraded parts), and the like. The failure diagnosis database 27 is a database for storing information required for failure diagnosis (for example, expert knowledge information of failure diagnosis).

The support unit 24 analyzes the use state, the operation state, etc., of each control measurement system 31 based on information transmitted from the control measurement system 31 (described later in detail), and preparing the support information appropriate for the user based on the analysis result.

Figure 2:
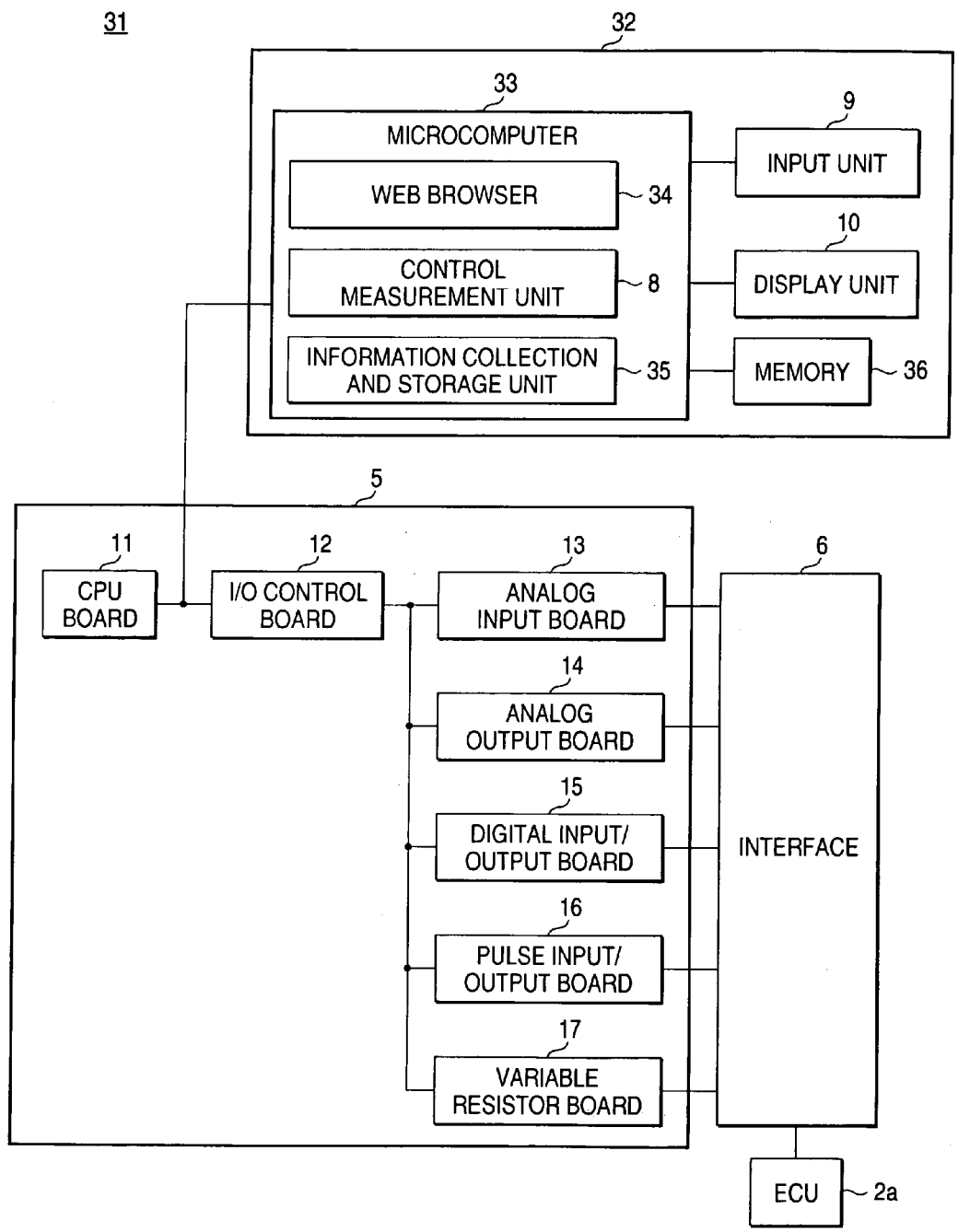
FIG. 2 is a block diagram to schematically show the main part of a control measurement system in the support system according to the first embodiment of the invention.
Figure 13:
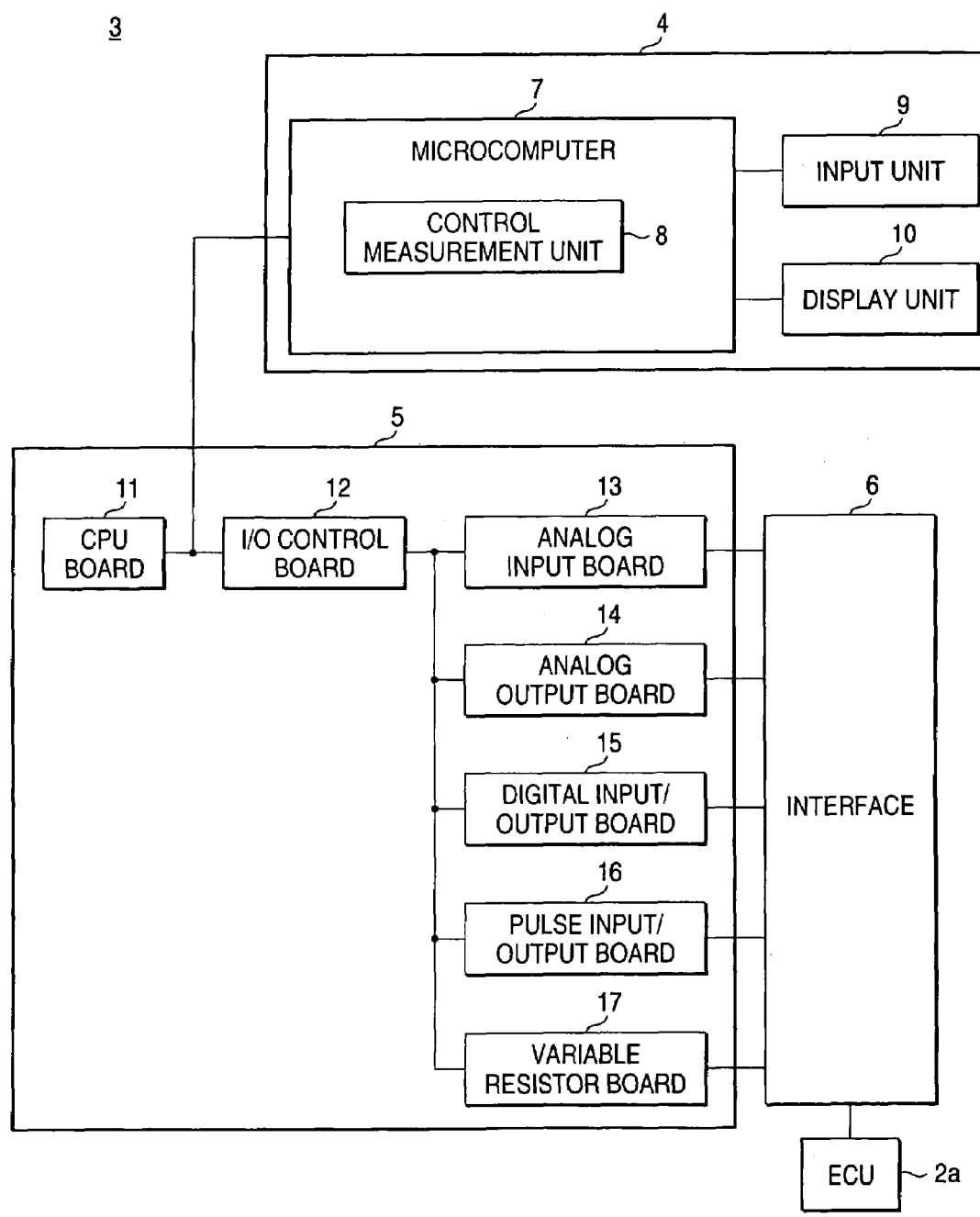
FIG. 13 is a block diagram to schematically show the main part of the control measurement system in the related art.

FIG. 2 is a block diagram to schematically show the main part of the control measurement system 31. Components identical with those of the control measurement system 3 previously described with reference to FIG. 13 are denoted by the same reference numerals in FIG. 2 and will not be discussed again. The control measurement system 31 includes a computer 32, a measurement board and rack 5, and an ECU interface box 6. The computer 32 includes a microcomputer 33 having a Web browser 34 for accessing the support center 21 and transferring information to and from the support center 21, a control measurement unit 8, and an information collection and storage unit 35 for collecting information, which is available for support, an input unit 9, a display unit 10, and memory 36.

The information collection and storage unit 35 collects information concerning user's setting for the control measurement system 31 (for example, information concerning I/O port assignment, numeric value conversion expression in I/O port, calculation period, etc.,) and autonomously starts to operate and periodically collects information concerning the operation state of the control measurement system 31 (for example, failure information, information concerning CPU load, information concerning user operation procedure, and information concerning the operation time) and stores the collected information in the memory 36.

The Web browser 34 is provided for accessing the support center 21 and is connected to the support center 21 via the network 28. When information transfer is started, the Web browser 34 transmits various pieces of information stored in the memory 36 via the network 28 to the support center 21.

Figure 3:
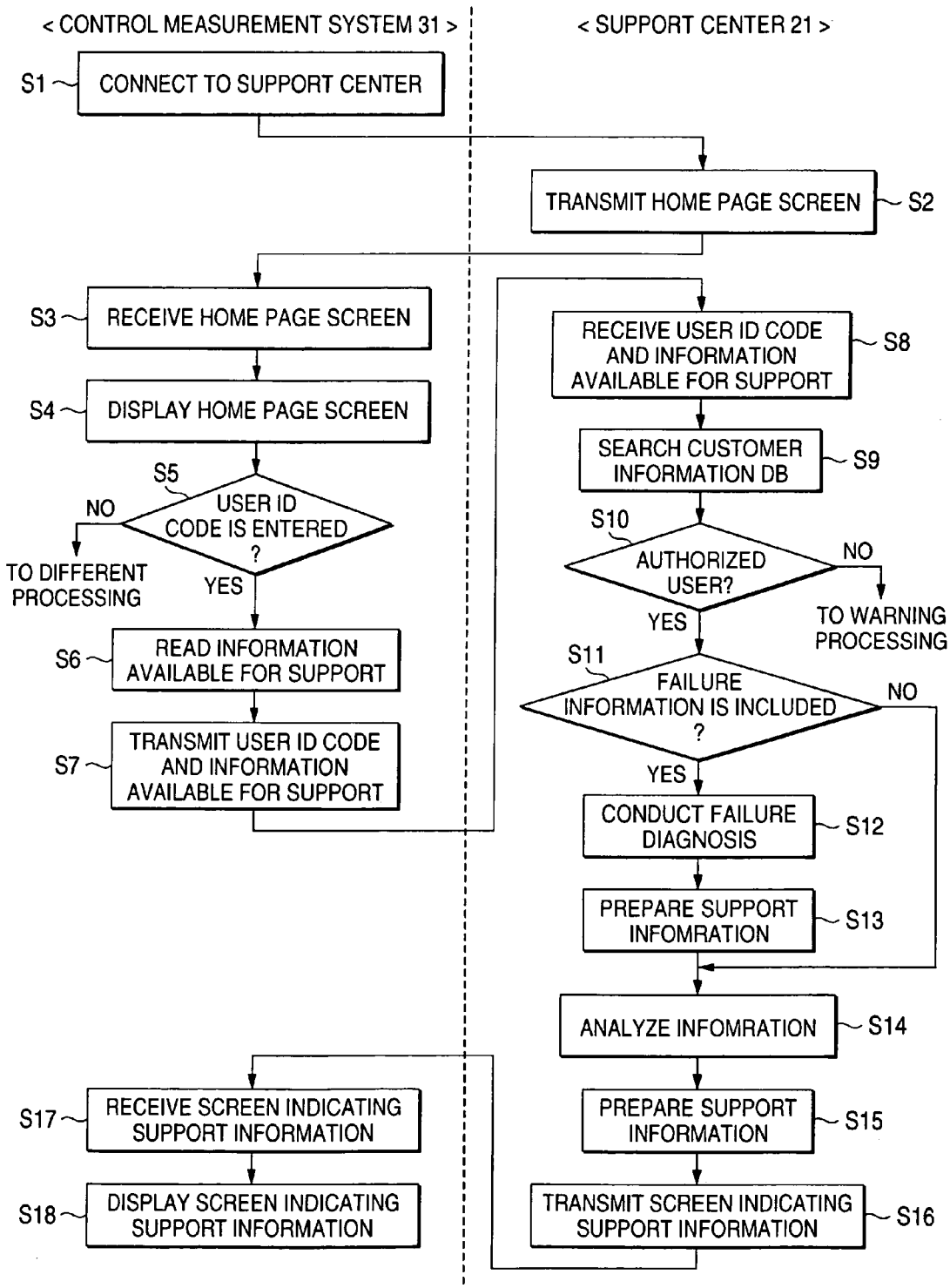
FIG. 3 is a flowchart to show processing operation in the control measurement system and a support center of the support system according to the first embodiment of the invention.

Next, processing operation (1) in the control measurement system 31 and the support center 21 of the support system according to the first embodiment will be discussed based on a flowchart of FIG. 3. First, when the control measurement system 31 delivered to each user is connected to the support center 21 via the network 28 (step S1), the support center 21 transmits a home page screen for enabling the user to enter the ID code to the control measurement system 31 (step S2).

Upon reception of the home page screen (step S3), the control measurement system 31 displays the received home page screen on the display unit 10 (step S4). When the user enters the ID code through the home page screen (step S5), the information which is available for support of the control measurement system 31 and is stored in the memory 36 is read (step S6) and the entered ID code and the read information are transmitted to the support center 21 (step S7). On the other hand, if the user does not enter ID code and enters another command at step S5, different processing operation responsive to the command is performed.

Upon reception of the ID code and the information (step S8), the support center 21 searches the customer information database 25 based on the received ID code (step S9) and determines whether or not the user is a registered customer (step S10).

If it is determined that the user is a registered customer, whether or not the received information contains failure information is determined (step S11). If it is determined that the received information contains failure information, a failure diagnosis of the control measurement system 31 is conducted based on the received failure information and the information stored in the failure diagnosis database 27 (step S12), and support information for the user is prepared based on the failure diagnosis result (step S13). Then, control goes to step S14.

On the other hand, if it is not determined that the received information contains failure information, steps S12 and S13 are skipped and control goes to step S14.

If it is not determined at step S10 that the user is a registered customer, a message of "enter valid ID code" is transmitted to the control measurement system 31.

At step S14, the use state and the operation state of the control measurement system 31 are analyzed based on the received information, the information concerning the system configuration stored in the customer information database 25, and the information concerning the structures and operation characteristics of the parts stored in the parts information database 26. Support information for the user is prepared based on the analysis result (step SIS). Then, a screen indicating the prepared support information is transmitted to the control measurement system 31 (step S16).

Upon reception of the screen indicating the support information (step S17), the control measurement system 31 displays the received screen on the display unit 10 (step S18).

Next, the analysis processing at step S14 and the support information preparing processing at step S15 will be discussed with specific examples A and B.

A) If the information transmitted from the control measurement system 31 contains the information concerning I/O port assignment, the number of channels used with each board is found from the information and whether or not the number of channels is enough is determined. If it is not determined that the number of channels is enough, support information meaning that "it is advisable to install an additional board" or "it is advisable to replace with a board having a large number of channels" is prepared or information concerning a new upgraded board is prepared as the support information for the user based on the replacement parts information stored in the parts information database 26.

In a support system according to another embodiment, a seminar database storing information concerning the schedule, the contents, the subjects, etc., of each seminar may be provided in the support center 21. For the user determined to insufficiently understand the use method of the system, seminar guide information may be prepared as the support information for the user.

Whether or not the number of channels is enough can be determined from the number of channels of each of the boards making up the control measurement system 31 and the information concerning I/O port assignment, transmitted from the control measurement system 31. The number of channels of each of the boards making up the control measurement system 31 can be found based on the information concerning the board types and versions stored in the customer information database 25 and the information concerning the structures of the boards stored in the parts information database 26 (the number of channels).

B) If the information transmitted from the control measurement system 31 contains the information concerning CPU load, the extent to which the capability of a CPU board 11 is used is found from the information and whether or not the CPU board 11 has sufficient capability is determined. If it is not determined that the CPU board 11 has sufficient capability, support information meaning that "it is advisable to upgrade the CPU board 11" is prepared.

Whether or not the CPU board 11 has sufficient capability can be determined from the capability of the CPU board 11 forming a part of the control measurement system 31 and the information concerning CPU load, transmitted from the control measurement system 31. The capability of the CPU board 11 forming a part of the control measurement system 31 can be found based on the information concerning the type and the version of the CPU board 11 stored in the customer information database 25 and the information concerning the structure of the CPU board 11 stored in the parts information database 26 (capability).

According to the support system according to the first embodiment, the support center 21 can acquire the information concerning user's setting for the control measurement system 31 to be supported (for example, information concerning I/O port assignment, numeric value conversion expression in I/O port, calculation period, etc.,) and the information concerning the operation state of the control measurement system 31, so that if the support person does not make a visit to each user, the support center 21 can keep track of the setup state and the operation state of the control measurement system 31 delivered to the user.

Therefore, the support center 21 can analyze the use state and the operation state of the control measurement system 31 based on the information concerning user's setting for the control measurement system 31, and can give appropriate advice to the user based on the analysis result.

In the support system according to the first embodiment, the use state, the operation state, etc., of the control measurement system 31 is automatically analyzed based on the information transmitted from the control measurement system 31 and the support information is automatically prepared based on the analysis result and further the prepared support information is also automatically transmitted to the user. In a support system according to another embodiment, the automatically prepared support information may be provided for a support person in the support center 21 so that the support person can give direct address to the user by telephone, etc.

In a support system according to still another embodiment, the information analysis result may be provided for a support person so that the support person can also prepare the support information, or only the information transmitted from the control measurement system 31 is provided for the support person so that the support person can also analyze the information and prepare the support information.

Incidentally, in the first embodiment, when the support center 21 and the control measurement system 31 are connected through the network, information is transmitted from the control measurement system 31 to the support center 21 along with an inputted user ID. However, the invention is not limited to this embodiment. The information transmitted from the control measurement system 31 may be transmitted at a predetermined timing. The predetermined timing may be a time when an amount of information stored in the information collection and storage unit 35 exceed a predetermined amount, a time when user at the control measurement system 31 side requests to transmit the information to the support center 21, or a time when the support center 21 requests to transmit the information. The information may be transmitted to the support center 21 periodically.

Figure 4:
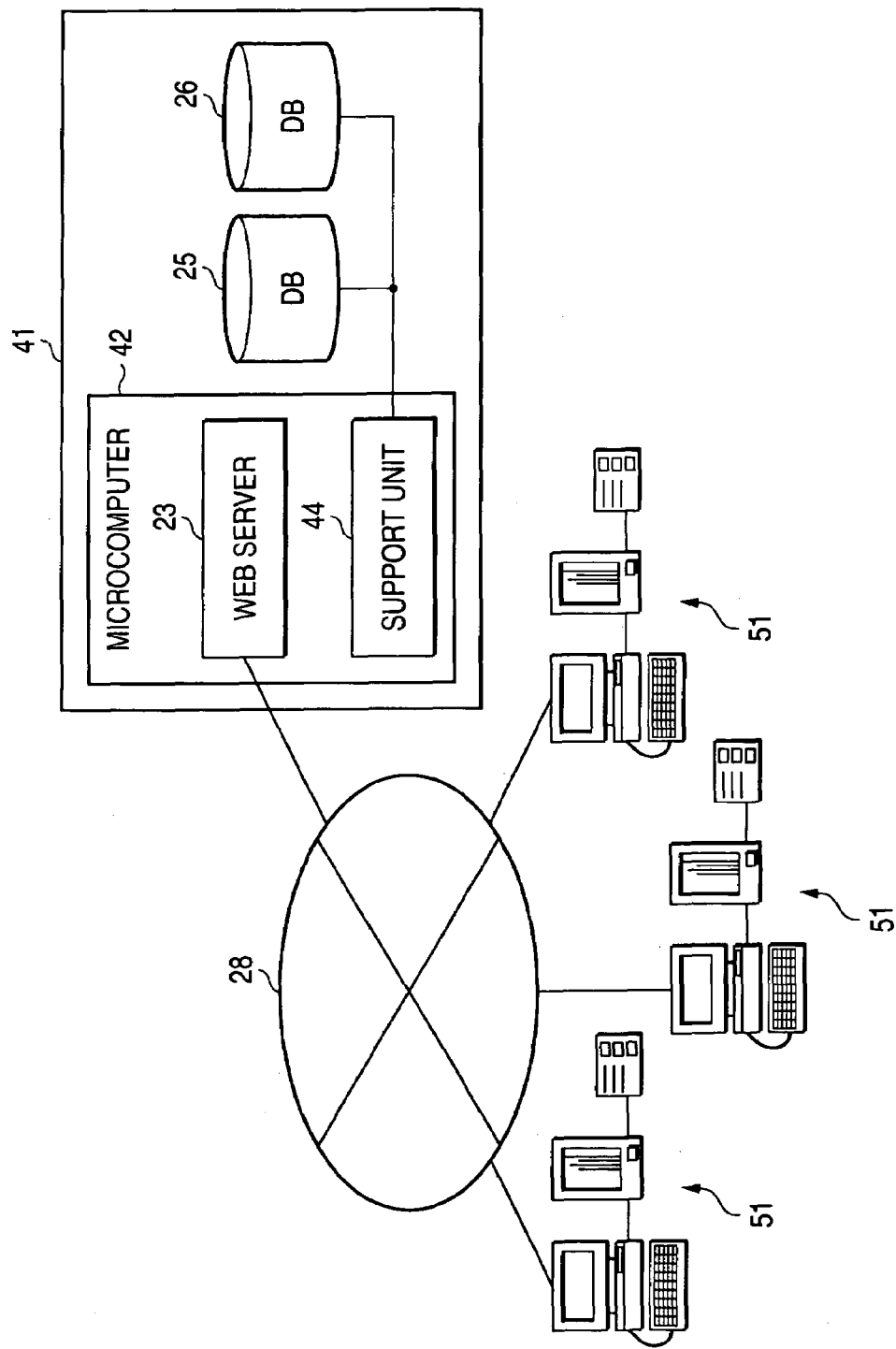
FIG. 4 is a block diagram to schematically show the main part of a support system according to a second embodiment of the invention.

FIG. 4 is a block diagram to schematically show the main part of a support system according to a second embodiment of the invention. In the figure, numeral 41 denotes a support center. The support center 41 includes a microcomputer 42 having a Web server 23 and a support unit 44 for preparing information concerning appropriate replacement parts (containing software) and upgrade of a control measurement system 51 delivered to each user, a customer information database 25, and a parts information database 26. The support center 41 is connected to a network 28.

Figure 5:
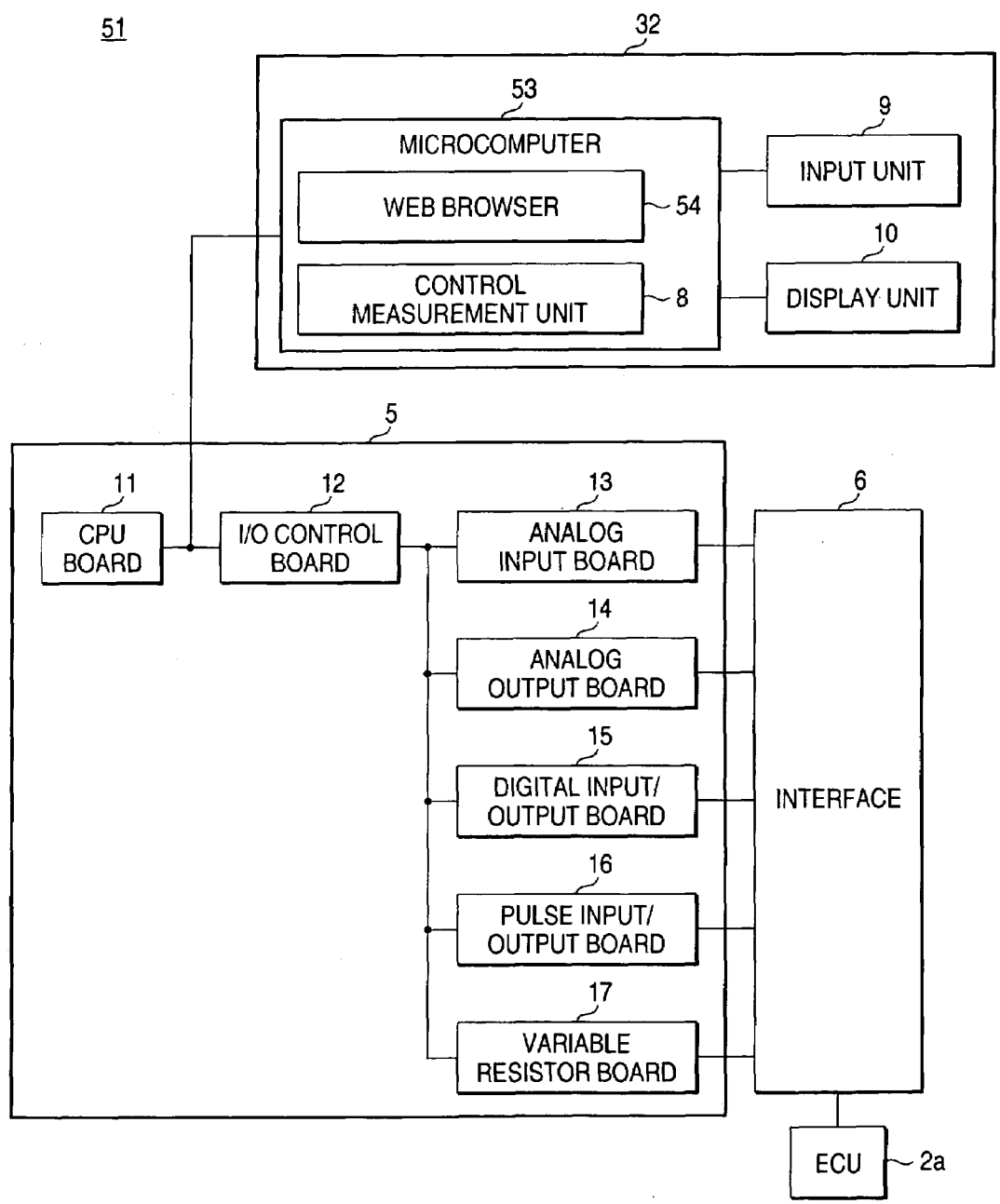
FIG. 5 is a block diagram to schematically show the main part of a control measurement system in the support system according to the second embodiment of the invention.

FIG. 5 is a block diagram to schematically show the main part of the control measurement system 51. Components identical with those of the control measurement system 3 previously described with reference to FIG. 13 are denoted by the same reference numerals in FIG. 5 and will not be discussed again. The control measurement system 51 includes a computer 52, a measurement board and rack 5, and an ECU interface box 6. The computer 52 includes a microcomputer 53 having a Web browser 54 for accessing the support center 41 and transferring information to and from the support center 41 and the control measurement unit 8, the input unit 9, and the display unit 10.

Figure 6:
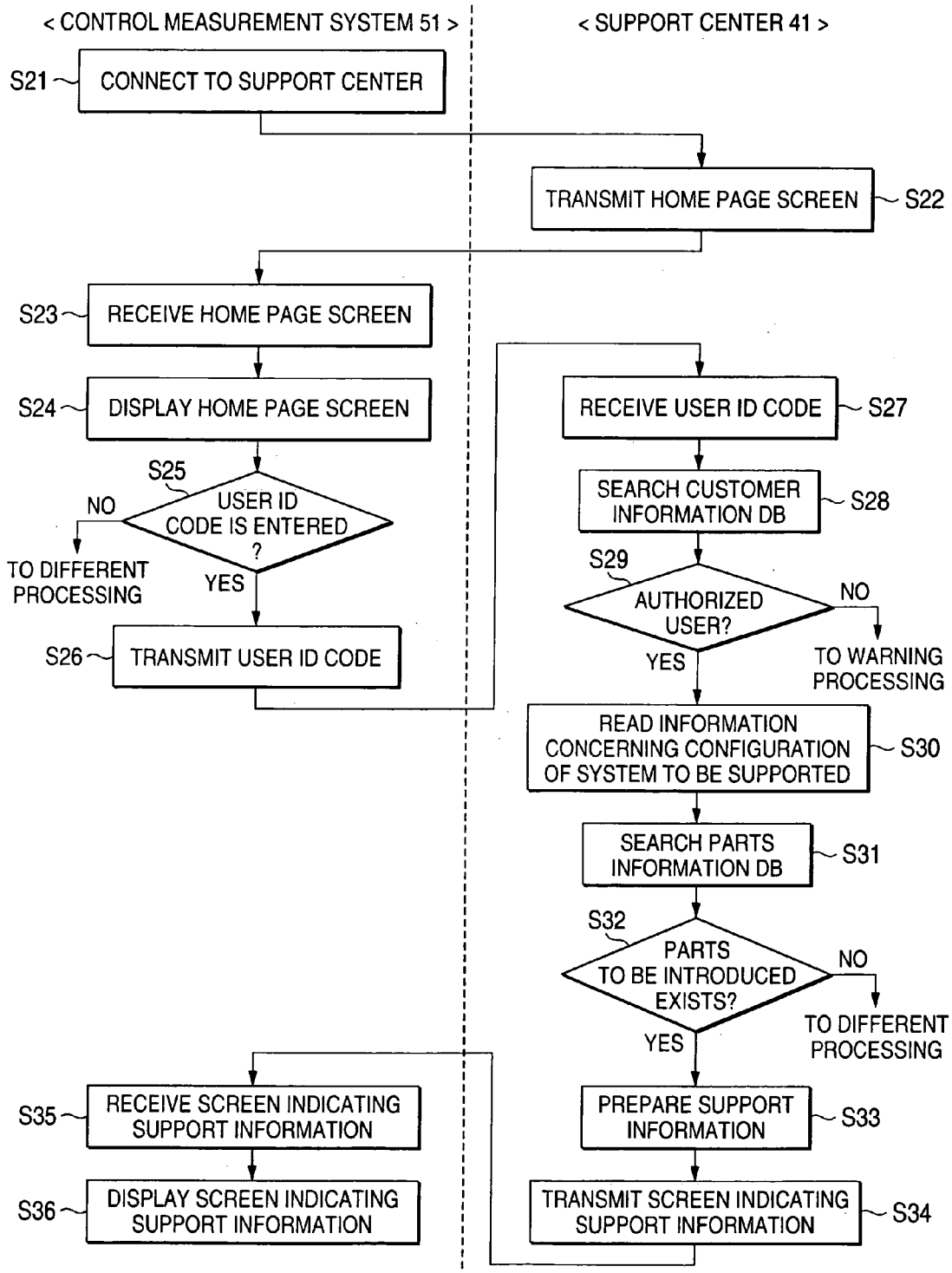
FIG. 6 is a flowchart to show processing operation in the control measurement system and a support center of the support system according to the second embodiment of the invention.

Next, processing operation (2) in the control measurement system 51 and the support center 41 of the support system according to the second embodiment will be discussed based on a flowchart of FIG. 6. First, when the control measurement system 51 delivered to each user is connected to the support center 31 via the network 28 (step S21), the support center 41 transmits a home page screen for enabling the user to enter the ID code to the control measurement system 51 (step S22).

Upon reception of the home page screen (step S23), the control measurement system 51 displays the received home page screen on the display unit 10 (step S24). When the user enters the ID code through the home page screen (step S25), the entered ID code is transmitted to the support center 41 (step S26). On the other hand, if the user does not enter ID code and enters another command at step S25, different processing operation responsive to the command is performed.

Upon reception of the ID code (step S27), the support center 41 searches the customer information database 25 based on the received ID code (step S28) and determines whether or not the user is a registered customer (step S29).

If it is determined that the user is a registered customer, information concerning the configuration of the control measurement system 51 delivered to the user, stored in the customer information database 25 is read (step S30), the parts information database 26 is searched for replacement parts information based on the read information (step S31), and whether or not parts information to be introduced to the user (for example, information concerning appropriate replacement parts and upgrade of the control measurement system 51) exists is determined (step S32). On the other hand, if it is not determined at step S29 that the user is a registered customer, a message of "enter valid ID code" is transmitted to the control measurement system 51.

If it is determined at step S32 that the information to be introduced exists, the information concerning the appropriate replacement parts and upgrade of the control measurement system 51 is prepared as support information for the user (step S33) and then a screen indicating the prepared support information is transmitted to the control measurement system 51 (step S34). On the other hand, if it is not determined at step S32 that the information to be introduced exists, it is not necessary to provide the user with the information concerning the replacement parts, etc., and thus different processing operation is performed.

Upon reception of the screen indicating the support information (step S35), the control measurement system 51 displays the received screen on the display unit 10 (step S36).

According to the support system according to the second embodiment, if it is determined that parts replacement or upgrade should be carried out based on the information concerning the configuration of the control measurement system 51, the information concerning the appropriate replacement parts or upgrade can be prepared as the support information for the user and the prepared information can be transmitted to the user.

That is, if a new commodity that can be used with the control measurement system 51 is developed or the already installed parts are upgraded, the user can be informed of the fact. Therefore, the commodity information fitted for each user can be provided for the user.

Figure 7:
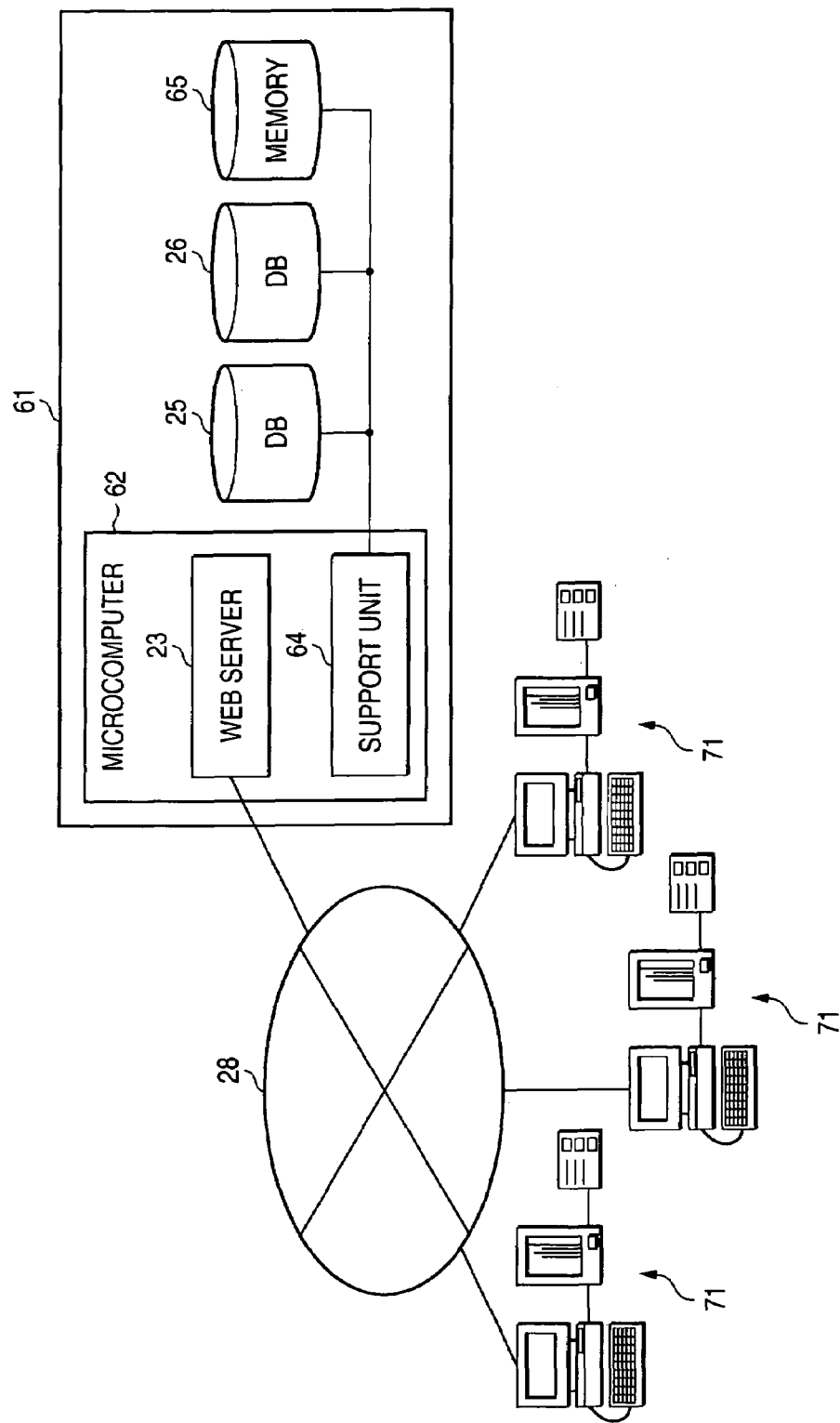
FIG. 7 is a block diagram to schematically show the main part of a support system according to a third embodiment of the invention.

FIG. 7 is a block diagram to schematically show the main part of a support system according to a third embodiment of the invention. In the figure, numeral 61 denotes a support center. The support center 61 includes a microcomputer 62 having a Web server 23 and support unit 64 for preparing information concerning software upgrade of a control measurement system 71 delivered to each user, a customer information database 25, a parts information database 26, and memory 65 storing the latest versions of various products of software. The support center 61 is connected to a network 28.

Figure 8:
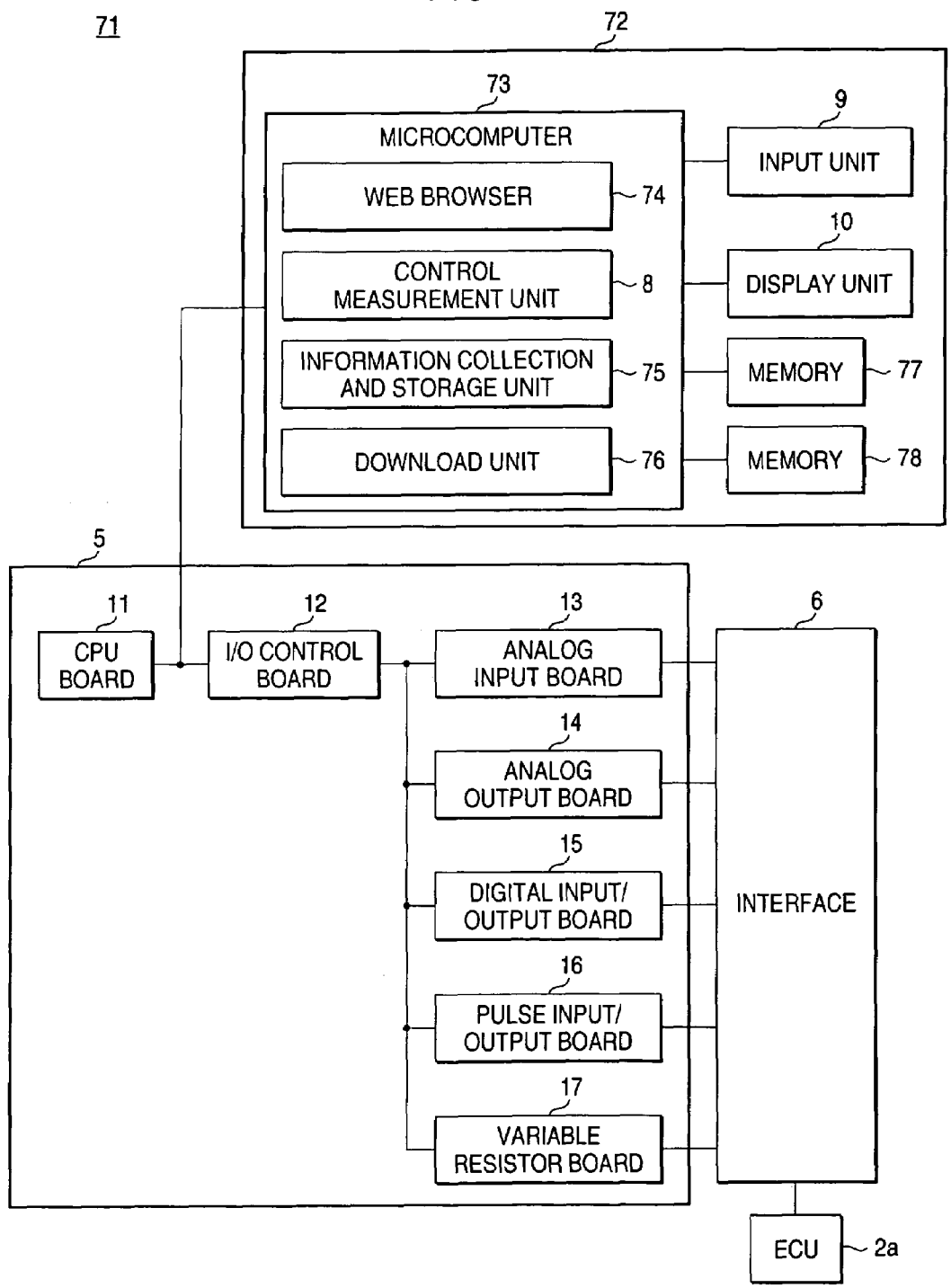
FIG. 8 is a block diagram to schematically show the main part of a control measurement system in the support system according to the third embodiment of the invention.

FIG. 8 is a block diagram to schematically show the main part of the control measurement system 71. Components identical with those of the control measurement system 3 previously described with reference to FIG. 13 are denoted by the same reference numerals in FIG. 8 and will not be discussed again. The control measurement system 71 includes a computer 72, a measurement board and rack 5, and an ECU interface box 6. The computer 72 includes a microcomputer 73 having a Web browser 74 for accessing the support center 61 and transferring information to and from the support center 61, a control measurement unit 8, an information collection and storage unit 75 for collecting information which is available for support, and a download unit 76 for downloading data transmitted from the support center 61, the input unit 9, the display unit 10, and memory 77 and memory 78 for storing the data transmitted from the support center 61.

The information collection and storage unit 75 collects information concerning various products of software built in the control measurement system 71 (for example, information concerning the software versions), and stores the collected information in the memory 78.

The Web browser 74 is provided for accessing the support center 61 and is connected to the support center 61 via the network 28. When information transfer is started, the Web browser 74 transmits various pieces of information stored in the memory 78 via the network 28 to the support center 61.

Figure 9:
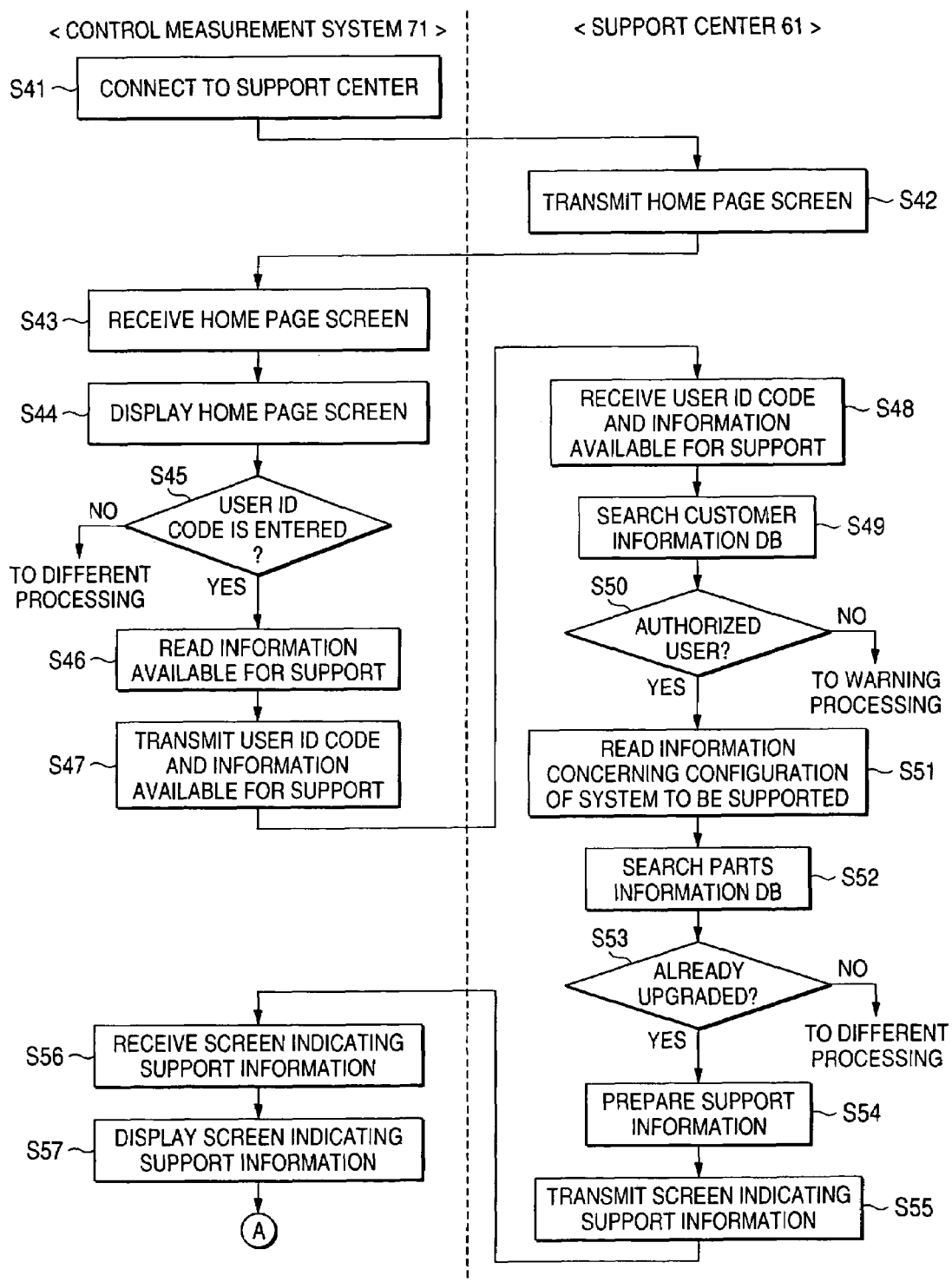
FIG. 9 is a flowchart to show processing operation in the control measurement system and a support center of the support system according to the third embodiment of the invention.
Figure 10:
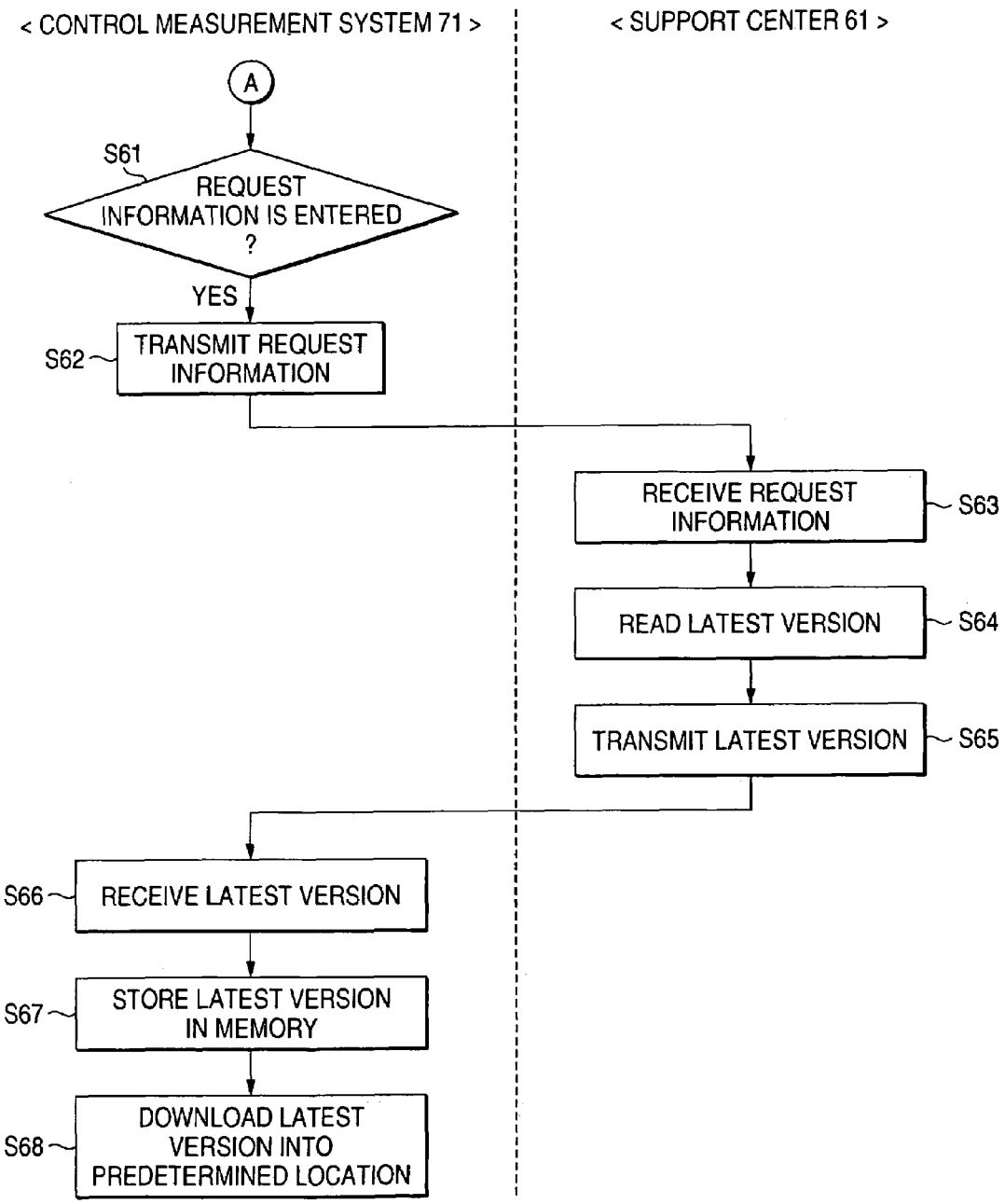
FIG. 10 is a flowchart to show the processing operation in the control measurement system and the support center of the support system according to the third embodiment of the invention.
Figure 11:
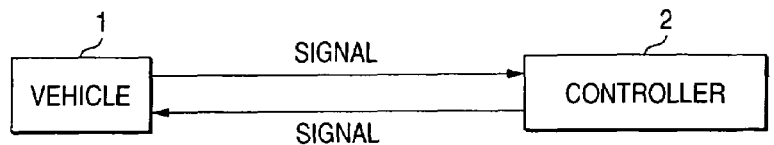
FIGS. 11(a) and (b) are conceptual drawings to show the concept regarding evaluation of a controller.
Figure 11:
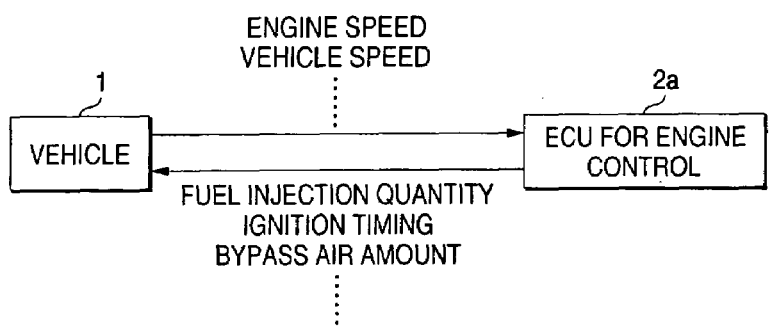
Figure 12:
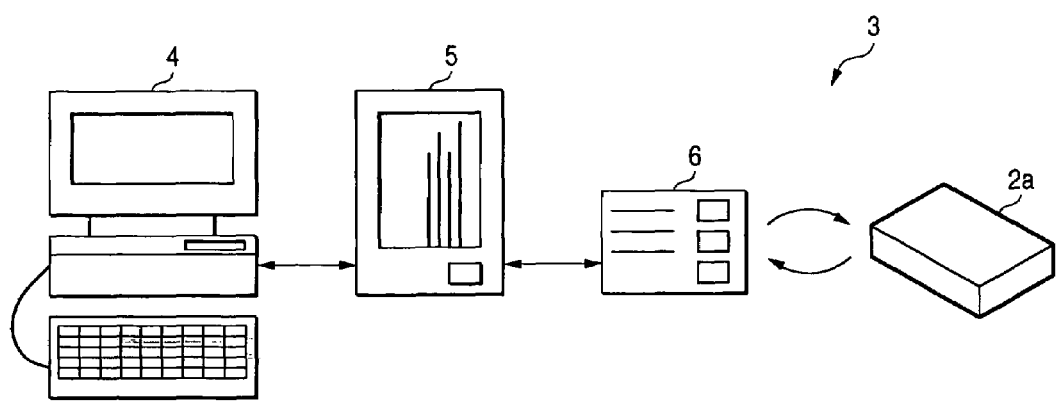
FIG. 12 is an appearance drawing to show a control measurement system in a related art.

Next, processing operation (3) in the control measurement system 71 and the support center 61 of the support system according to the third embodiment will be discussed based on flowcharts of FIGS. 9 and 10. First, when the control measurement system 71 delivered to each user is connected to the support center 61 via the network 28 (step S41), the support center 61 transmits a home page screen for enabling the user to enter the ID code to the control measurement system 71 (step S42).

Upon reception of the home page screen (step S43), the control measurement system 71 displays the received home page screen on the display unit 10 (step S44). When the user enters the ID code through the home page screen (step S45), the information which is available for support of the control measurement system 71, stored in the memory 78 is read (step S46) and the entered ID code and the read information are transmitted to the support center 61 (step S47). On the other hand, if the user does not enter ID code and enters another command at step S45, different processing operation responsive to the command is performed.

Upon reception of the ID code and the information (step S48), the support center 61 searches the customer information database 25 based on the received ID code (step S49) and determines whether or not the user is a registered customer (step S50).

If it is determined that the user is a registered customer, information concerning the configuration of the control measurement system 71 delivered to the user, stored in the customer information database 25 is read (step S51), the parts information database 26 is searched for replacement parts information based on the read information (step S52), and whether all software built in the control measurement system 71 is of the latest versions is determined (step S53). On the other hand, if it is not determined at step S50 that the user is a registered customer, a message of "enter valid ID code" is transmitted to the control measurement system 71.

If it is determined at step S53 that software which is not of the latest version exists, information concerning software of the latest version that can be built in the control measurement system 71 is prepared as support information for the user (step S54) and then a screen indicating the prepared support information is transmitted to the control measurement system 71 (step S55). On the other hand, if it is determined at step S53 that all software is updated to the latest versions, it is not necessary to provide the user with the information concerning the software of the latest versions and thus different processing operation is performed.

Upon reception of the screen indicating the support information (step S56), the control measurement system 71 displays the received screen on the display unit 10 (step S57). If the user enters a request to transmit the software of the latest version through the display screen (step S61), the entered request information is transmitted to the support center 61 (step S62). On the other hand, if the user does not enter a request to transmit the software of the latest version and enters another command at step S61, different processing operation responsive to the command is performed.

Upon reception of the request information transmitted from the control measurement system 71 (step S63), the support center 61 reads the data forming the software from the memory 65 (step S64) and transmits the read data to the control measurement system 71 (step S65).

Upon reception of the data forming the software of the latest version transmitted from the support center 61 (step S66), the control measurement system 71 once stores the received data in the memory 77 (step S67) and then downloads the data into a predetermined location (step S68).

According to the support system according to the third embodiment, the support center 61 can acquire the information concerning the software built in the control measurement system 71 (for example, information concerning the versions of basic software, driver software, I/O board firmware, etc.,).

The support center 61 can use the information to determine whether or not the software built in the control measurement system 71 contains any product of not the latest version and can inform the user using the software product of not the latest version that the software product of the latest version is available.

Further, if the user makes a request, the software product of the latest version can be transmitted through the network 28, so that the very excellent system high in practicality can be provided.

In the support systems according to the first to third embodiments, the user enters the ID code to identify the user, whereby the ID code is transmitted to the support center 21, 41, 61. However, when the control measurement system 31, 51, 71 is connected to the support center 21, 41, 61, automatically identification information to identify the user (for example, ID code) may be transmitted; as means for providing such a function, HTTP Cookie implemented in a browser, proposed by Netscape Communications USA is available.

What is claimed is:

1. A support system, comprising:
   a support device; and
   a control measurement system for a vehicular electronic control unit that simulates statuses of members of a vehicle and outputs a simulating result to the vehicular electronic control unit,
   wherein the control measurement system includes a collection and transmission unit that collects a setup state of the control measurement system, which is changed by a user, and transmits the setup state to the support device at a predetermined timing;
   wherein the support device includes a storage unit to store the setup state transmitted from the control measurement system and to store predetermined information, and an analysis unit for analyzing the setup state transmitted from the control measurement system and the predetermined information;
   wherein the support device further includes a preparation unit for preparing support information based on an analysis result by the analysis unit, and a transmission unit for transmitting the support information to the control measurement system;
   wherein the support information contains advice to the user; and wherein the setup state of the control measurement system includes one of information concerning I/O port assignment, numeric value conversion expression in I/O port, or calculation period.

2. The support system according to claim 1,
   wherein the predetermined information contains information concerning configuration of the control measurement system; and
   wherein the analysis result by the analysis unit indicates use state of the control measurement system.

3. The support system according to claim 1,
   wherein the control measurement system transmits information concerning operation state of the control measurement system.

4. The support system according to claim 3,
   wherein the information concerning the operation state of the control measurement system contains at least one of failure information, information concerning load on a CPU, information concerning an operation procedure by the user, and information concerning operating time.

5. The support system according to claim 1,
   wherein the control measurement system transmits information concerning operation state of the control measurement system, the information concerning operation state of the control measurement system having failure information; and
   wherein the analysis result by the analysis unit indicates failure diagnosis of the control measurement system.

6. The support system according to claim 1,
   wherein the control measurement system transmits information concerning operation state of the control measurement system, the information concerning operation state of the control measurement system having information concerning load on a CPU; and
   wherein the analysis result by the analysis unit indicates operation state of the control measurement system.

7. The support system according to claim 1,
   wherein the control measurement system transmits information concerning operation state of the control measurement system, the information concerning operation state of the control measurement system having at least one of information concerning an operation procedure by the user and information concerning operating time; and
   wherein the analysis result by the analysis unit indicates use state by the user.

8. The support system according to claim 2,
   wherein the predetermined information contains at least one of information concerning replacement parts with respect to the control measurement system and information concerning upgrade; and
   wherein the analysis result by the analysis unit indicates at least one of information concerning replacement parts suitable for the control measurement system and information concerning upgrade of the control measurement system.

9. The support system according to claim 1,
   wherein the predetermined information contains at least one of information concerning replacement parts with respect to the control measurement system and information concerning upgrade; and
   wherein the analysis result by the analysis unit indicates at least one of information concerning replacement parts suitable for the control measurement system and information concerning upgrade of the control measurement system.

10. The support system according to claim 1,
    wherein the control measurement system transmits information concerning software.

11. The support system according to claim 10,
    wherein the predetermined information contains information concerning upgrade of the software, which has been installed in the control measurement system; and
    wherein the support information is information concerning software suitable for the control measurement system.

12. The support system according to claim 11,
wherein the predetermined information further contains data forming the software suitable for the control measurement system;
wherein when if is requested to transmit the data to the control measurement system, the support device transmission unit transmits the data;
wherein the control measurement system further includes a command unit by which the user commands the data transmission; and
wherein control measurement system the transmission unit transmits a signal indicating the request to transmit the data to the support device.

13. The support system according to claim 1, wherein the control measurement system simulates a vehicle and calculates a state amount of the vehicle including revolutions of an engine and a velocity of the vehicle.

14. A support system, comprising:
a support device; and
a control measurement system for a vehicular electronic control unit that simulates statuses of members of a vehicle and outputs a simulating result to the vehicular electronic control unit,
wherein the control measurement system includes a collection and transmission unit that collects a setup state of the control measurement system, which is changed by a user, and transmits the setup state to the support device at a predetermined timing;
wherein the support device includes a storage unit to store the setup state transmitted from the control measurement system and to store predetermined information, and an analysis unit for analyzing the setup state transmitted from the control measurement system and the predetermined information;
wherein the support device further includes a preparation unit for preparing support information based on an analysis result by the analysis unit, and a transmission unit for transmitting the support information to the control measurement system; and
wherein the setup state of the control measurement system includes information concerning I/O port assignment, numeric value conversion expression in I/O port, and calculation period.

\* \* \* \* \*